US012769871B2

(12) United States Patent
Griffin et al.

(10) Patent No.: US 12,769,871 B2
(45) **Date of Patent: *Oct. 20, 2026**

(54) HYBRID COGNITIVE SYSTEM FOR AI/ML DATA PRIVACY

(71) Applicant: Cisco Technology, Inc., San Jose, CA (US)

(72) Inventors: Keith Griffin, County Galway (IE); Jonathan Rosenberg, Freehold, NJ (US)

(73) Assignee: Cisco Technology, Inc., San Jose, CA (US)

( * ) Notice: Subject to any disclaimer, the term of this patent is extended or adjusted under 35 U.S.C. 154(b) by 178 days.

This patent is subject to a terminal disclaimer.

(21) Appl. No.: 18/667,031

(22) Filed: May 17, 2024

(65) Prior Publication Data

US 2024/0303374 A1 Sep. 12, 2024

Related U.S. Application Data

(63) Continuation of application No. 18/363,533, filed on Aug. 1, 2023, now Pat. No. 12,050,714, which is a (Continued)

(51) Int. Cl.

*G06F 21/62* (2013.01)
*G06F 9/451* (2018.01)

(Continued)

(52) U.S. Cl.

CPC .......... *G06F 21/6245* (2013.01); *G06F 9/453* (2018.02); *G06F 16/9535* (2019.01); *G06N 20/00* (2019.01); *H04L 67/1097* (2013.01)

(58) Field of Classification Search

CPC .. G06F 21/6245; G06F 9/453; G06F 16/9535; G06N 20/00; H04L 67/1097; G06Q 10/06

(Continued)

(56) References Cited

U.S. PATENT DOCUMENTS 5,185,848 A 2/1993 Aritsuka et al.
5,917,537 A 6/1999 Lightfoot et al.

(Continued)

FOREIGN PATENT DOCUMENTS

CN 102004671 B 3/2013

OTHER PUBLICATIONS

Akkaya K., et al., "A Survey on Routing Protocols for Wireless Sensor Networks," Abstract, Ad Hoc Networks, May 2005, vol. 3, No. 3, 1 Page.

(Continued)

*Primary Examiner* — Badrinarayanan
(74) *Attorney, Agent, or Firm* — Polsinelli P.C.

(57) ABSTRACT

Systems, methods, and devices are disclosed for cognitive collaboration systems on a hybrid node. A query is received by a virtual assistant running on a public cloud, and it is determined whether the query pertains to data available on a public cloud resource, or the query pertains to data available on a private cloud resource. When it is determined that the query pertains to the data available on the public cloud resource, the query is interpreted by using a first model trained on at least one machine learning technique on data from the public cloud. When it is determined that the query pertains to the data available on the private cloud resource, the query is interpreted by using a second model trained on at least one machine learning technique on the data from the private cloud.

20 Claims, 5 Drawing Sheets

Related U.S. Application Data continuation of application No. 17/104,639, filed on Nov. 25, 2020, now Pat. No. 11,763,024, which is a continuation of application No. 16/002,934, filed on Jun. 7, 2018, now Pat. No. 10,867,067.

(51) Int. Cl.

| | |
|---|---|
| ***G06F 16/9535*** | (2019.01) |
| ***G06N 20/00*** | (2019.01) |
| *H04L 67/1097* | (2022.01) |

(58) Field of Classification Search

USPC ........................................................... 726/27

See application file for complete search history.

(56) References Cited

U.S. PATENT DOCUMENTS 5,970,064 A 10/1999 Clark et al.
6,023,606 A 2/2000 Monte et al.
6,115,393 A 9/2000 Engel et al.
6,298,351 B1 10/2001 Castelli et al.
6,456,624 B1 9/2002 Eccles et al.
6,597,684 B1 7/2003 Gulati et al.
6,697,325 B1 2/2004 Cain
6,721,899 B1 4/2004 Narvaez-Guarnieri et al.
6,816,464 B1 11/2004 Scott et al.
6,894,714 B2 5/2005 Gutta et al.
6,954,617 B2 10/2005 Dacosta
7,185,077 B1 2/2007 O'Toole et al.
7,453,864 B2 11/2008 Kennedy et al.
7,496,650 B1 2/2009 Previdi et al.
7,636,763 B1 * 12/2009 Fein ........................ H04L 63/10 709/212
7,747,601 B2 * 6/2010 Cooper ................. G06F 16/285 707/708
7,826,372 B1 11/2010 Mabe et al.
7,826,400 B2 11/2010 Sakauchi
7,831,685 B2 * 11/2010 Dai ........................ G06Q 30/02 709/217
7,848,340 B2 12/2010 Sakauchi et al.
7,987,181 B2 * 7/2011 Borthakur ......... G06F 16/24524 707/719
7,995,464 B1 8/2011 Croak et al.
8,059,557 B1 11/2011 Sigg et al.
8,063,929 B2 11/2011 Kurtz et al.
8,154,583 B2 4/2012 Kurtz et al.
8,274,893 B2 9/2012 Bansal et al.
8,385,355 B1 2/2013 Figueira et al.
8,489,765 B2 7/2013 Vasseur et al.
8,620,840 B2 12/2013 Newnham et al.
8,630,291 B2 1/2014 Shaffer et al.
8,634,314 B2 1/2014 Banka et al.
8,638,778 B2 1/2014 Lee et al.
8,707,194 B1 4/2014 Jenkins et al.
8,767,716 B2 7/2014 Trabelsi et al.
8,774,164 B2 7/2014 Klein et al.
8,788,517 B2 * 7/2014 Horvitz ................. G06F 16/951 707/759
8,842,161 B2 9/2014 Feng et al.
8,843,470 B2 * 9/2014 Li ....................... G06F 16/3331 707/708
8,856,584 B2 10/2014 Matsubara
8,862,522 B1 10/2014 Jaiswal et al.
8,880,477 B2 11/2014 Barker et al.
8,942,085 B1 1/2015 Pani et al.
8,948,054 B2 2/2015 Kreeger et al.
8,982,707 B2 3/2015 Moreno et al.
8,984,503 B2 * 3/2015 Poddar .................. G06F 16/583 717/173
9,137,119 B2 9/2015 Yang et al.
9,197,553 B2 11/2015 Jain et al.
9,324,022 B2 4/2016 Williams, Jr. et al.
9,338,065 B2 5/2016 Vasseur et al.
9,338,084 B2 5/2016 Badoni et al.
9,374,294 B1 6/2016 Pani
9,419,811 B2 8/2016 Dong et al.
9,544,224 B2 1/2017 Chu et al.
9,553,799 B2 1/2017 Tarricone et al.
9,558,451 B2 1/2017 Nilsson et al.
9,596,099 B2 3/2017 Yang et al.
9,614,756 B2 4/2017 Joshi
9,654,385 B2 5/2017 Chu et al.
9,798,978 B2 * 10/2017 Sanchez ................. G06Q 10/10
10,635,727 B2 * 4/2020 Liu ..................... G06F 16/2228
2002/0061001 A1 5/2002 Garcia-Luna-Aceves et al.
2002/0101505 A1 8/2002 Gutta et al.
2002/0105904 A1 8/2002 Hauser et al.
2002/0116154 A1 8/2002 Nowak et al.
2002/0159386 A1 10/2002 Grosdidier et al.
2003/0005149 A1 1/2003 Haas et al.
2003/0061340 A1 3/2003 Sun et al.
2003/0067912 A1 4/2003 Mead et al.
2003/0091052 A1 5/2003 Pate et al.
2003/0117992 A1 6/2003 Kim et al.
2003/0133417 A1 7/2003 Badt, Jr.
2003/0187800 A1 10/2003 Moore et al.
2003/0225549 A1 12/2003 Shay et al.
2004/0153563 A1 8/2004 Shay et al.
2004/0218525 A1 11/2004 Elie-Dit-Cosaque et al.
2005/0111487 A1 5/2005 Matta et al.
2005/0114532 A1 5/2005 Chess et al.
2005/0143979 A1 6/2005 Lee et al.
2005/0286711 A1 12/2005 Lee et al.
2006/0072471 A1 4/2006 Shiozawa
2006/0083193 A1 4/2006 Womack et al.
2006/0116146 A1 6/2006 Herrod et al.
2006/0133404 A1 6/2006 Zuniga et al.
2006/0274647 A1 12/2006 Wang et al.
2007/0047707 A1 3/2007 Mayer et al.
2007/0071030 A1 3/2007 Lee
2007/0083650 A1 4/2007 Collomb et al.
2007/0120966 A1 5/2007 Murai
2007/0149249 A1 6/2007 Chen et al.
2007/0192065 A1 8/2007 Riggs et al.
2007/0208590 A1 9/2007 Dorricott et al.
2008/0049622 A1 2/2008 Previdi et al.
2008/0089246 A1 4/2008 Ghanwani et al.
2008/0140817 A1 6/2008 Agarwal et al.
2008/0159151 A1 7/2008 Datz et al.
2008/0181259 A1 7/2008 Andreev et al.
2008/0192651 A1 8/2008 Gibbings
2008/0281794 A1 * 11/2008 Mathur ................. G06F 16/958
2008/0293353 A1 11/2008 Mody et al.
2009/0003232 A1 1/2009 Vaswani et al.
2009/0010264 A1 1/2009 Zhang
2009/0073988 A1 3/2009 Ghodrat et al.
2009/0094223 A1 * 4/2009 Berk ................... G06F 16/3338 707/999.005
2009/0129316 A1 5/2009 Ramanathan et al.
2009/0147714 A1 6/2009 Jain et al.
2009/0147737 A1 6/2009 Tacconi et al.
2009/0168653 A1 7/2009 St. Pierre et al.
2009/0271467 A1 10/2009 Boers et al.
2009/0303908 A1 12/2009 Deb et al.
2010/0046504 A1 2/2010 Hill
2010/0165863 A1 7/2010 Nakata
2011/0082596 A1 4/2011 Meagher et al.
2011/0116389 A1 5/2011 Tao et al.
2011/0149759 A1 6/2011 Jollota
2011/0228696 A1 9/2011 Agarwal et al.
2011/0255570 A1 10/2011 Fujiwara
2011/0267962 A1 11/2011 JS A et al.
2011/0274283 A1 11/2011 Athanas
2011/0295590 A1 * 12/2011 Lloyd ..................... G10L 15/22 704/8
2012/0009890 A1 1/2012 Curcio et al.
2012/0075999 A1 3/2012 Ko et al.
2012/0117007 A1 * 5/2012 Agrawal ................ G06F 16/29 707/711
2012/0163177 A1 6/2012 Vaswani et al.
2012/0192075 A1 7/2012 Ebtekar et al.
2012/0213062 A1 8/2012 Liang et al.
2012/0213124 A1 8/2012 Vasseur et al.

(56) References Cited

U.S. PATENT DOCUMENTS

| | | | | |
|---|---|---|---|---|
| 2012/0307629 | A1 | 12/2012 | Vasseur et al. | |
| 2012/0321058 | A1 | 12/2012 | Eng et al. | |
| 2013/0003542 | A1 | 1/2013 | Catovic et al. | |
| 2013/0010610 | A1 | 1/2013 | Karthikeyan et al. | |
| 2013/0028073 | A1 | 1/2013 | Tatipamula et al. | |
| 2013/0070755 | A1 | 3/2013 | Trabelsi et al. | |
| 2013/0094647 | A1 | 4/2013 | Mauro et al. | |
| 2013/0128720 | A1 | 5/2013 | Kim et al. | |
| 2013/0145017 | A1* | 6/2013 | Luna | H04W 72/53 709/224 |
| 2013/0177305 | A1 | 7/2013 | Prakash et al. | |
| 2013/0250754 | A1 | 9/2013 | Vasseur et al. | |
| 2013/0275589 | A1 | 10/2013 | Karthikeyan et al. | |
| 2013/0311673 | A1 | 11/2013 | Karthikeyan et al. | |
| 2014/0049595 | A1 | 2/2014 | Feng et al. | |
| 2014/0101119 | A1* | 4/2014 | Li | G06F 16/3331 707/706 |
| 2014/0126423 | A1 | 5/2014 | Vasseur et al. | |
| 2014/0133327 | A1 | 5/2014 | Miyauchi | |
| 2014/0204759 | A1 | 7/2014 | Guo et al. | |
| 2014/0207945 | A1 | 7/2014 | Galloway et al. | |
| 2014/0215077 | A1 | 7/2014 | Soudan et al. | |
| 2014/0219103 | A1 | 8/2014 | Vasseur et al. | |
| 2014/0293955 | A1 | 10/2014 | Keerthi | |
| 2014/0337840 | A1 | 11/2014 | Hyde et al. | |
| 2015/0023174 | A1 | 1/2015 | Dasgupta et al. | |
| 2015/0052095 | A1 | 2/2015 | Yang et al. | |
| 2015/0142702 | A1 | 5/2015 | Nilsson et al. | |
| 2015/0215365 | A1 | 7/2015 | Shaffer et al. | |
| 2015/0294216 | A1* | 10/2015 | Baughman | G06F 16/3329 706/11 |
| 2015/0324689 | A1 | 11/2015 | Wierzynski et al. | |
| 2015/0356427 | A1* | 12/2015 | Sanchez | G06N 5/022 706/55 |
| 2015/0358248 | A1 | 12/2015 | Saha et al. | |
| 2016/0037304 | A1 | 2/2016 | Dunkin et al. | |
| 2016/0105345 | A1 | 4/2016 | Kim et al. | |
| 2016/0203404 | A1 | 7/2016 | Cherkasova et al. | |
| 2016/0308799 | A1* | 10/2016 | Schubert | H04L 51/046 |
| 2016/0315802 | A1 | 10/2016 | Wei et al. | |
| 2016/0335111 | A1 | 11/2016 | Bruun et al. | |
| 2016/0358098 | A1* | 12/2016 | Duesterwald | G06N 20/00 |
| 2017/0091665 | A1* | 3/2017 | Sanchez | G06N 5/04 |
| 2017/0098168 | A1* | 4/2017 | Kozareva | G06N 5/04 |
| 2017/0099249 | A1* | 4/2017 | Kozareva | G06F 16/353 |
| 2017/0140322 | A1* | 5/2017 | Kozloski | G06N 20/00 |
| 2017/0150399 | A1 | 5/2017 | Kedalagudde et al. | |
| 2017/0228251 | A1 | 8/2017 | Yang et al. | |
| 2017/0289033 | A1 | 10/2017 | Singh et al. | |
| 2017/0347308 | A1 | 11/2017 | Chou et al. | |
| 2017/0353361 | A1 | 12/2017 | Chopra et al. | |
| 2018/0013656 | A1 | 1/2018 | Chen | |
| 2018/0018590 | A1* | 1/2018 | Szeto | G06N 20/00 |
| 2018/0052928 | A1* | 2/2018 | Liu | G06F 16/2228 |
| 2018/0089556 | A1* | 3/2018 | Zeiler | G06N 3/045 |
| 2018/0268035 | A1* | 9/2018 | Kalakanti | G06F 16/2453 |
| 2019/0034793 | A1* | 1/2019 | Kataria | G06F 16/3334 |
| 2019/0147455 | A1* | 5/2019 | Wang | G06N 5/022 707/723 |
| 2019/0278938 | A1* | 9/2019 | Greene | H04L 41/40 |
| 2019/0325068 | A1* | 10/2019 | Lai | G06Q 30/0631 |
| 2019/0372968 | A1* | 12/2019 | Balogh | G06N 20/00 |

OTHER PUBLICATIONS

Alsheikh M.A., et al., "Machine Learning in Wireless Sensor Networks: Algorithms, Strategies, and Applications," arxiv.org, Mar. 19, 2015, pp. 1-23.

Author Unknown, "White Paper on Service Enabler Virtualization," Open Mobile Alliance (OMA), San Diego, CA, USA, Nov. 9, 2015, 26 Pages.

Baccour N., et al., "Radio Link Quality Estimation in Wireless Sensor Networks: A Survey," ACM Transactions on Sensor Networks, Jan. 2011, 35 Pages.

Cisco Systems, Inc., "Vxlan Network with MP-BGP EVPN Control Plane Design Guide," 2016, updated: Jan. 22, 2018, 44 Pages.

Fan N., "Learning Nonlinear Distance Functions Using Neural Network for Regression with Application to Robust Human Age Estimation," Abstract, IEEE International Conference on Computer Vision (ICCV), Institute of Electrical and Electronics Engineers, Barcelona, Spain, Nov. 2011, 1 Page.

Flushing E.F., et al., "A Mobility-Assisted Protocol for Supervised Learning of Link Quality Estimates in Wireless Networks," Computing, Networking And Communications (ICNC), International Conference On, IEEE, Jan. 30, 2012, pp. 137-143, DOI:10.1109/ICCNC.2012.6167397, ISBN 978-1-4673-0008-7, XP032130651.

Fortunato S., "Community Detection in Graphs," arXiv:0906.0612v2 [physics.soc-ph], Physics Reports, Jan. 25, 2010, vol. 486, 103 Pages.

Godsill S., et al., "Detection And Suppression Of Keyboard Transient Noise In Audio Streams With Auxiliary Keybed Microphone," Abstract, IEEE International Conference on Acoustics, Speech and Signal Processing (ICASSP), Brisbane, QLD, Australia, Apr. 19-24, 2015, 1 Page, [Retrieved on Feb. 28, 2018], Abstract available at http/ieeexplore.ieee.org/document/7177995/.

Hershey S., et al., "CNN Architectures for Large-Scale Audio Classification," Google Inc., New York, NY, and Mountain View, CA, USA, Jan. 10, 2017, 5 Pages.

Hradis M., et al., "Voice Activity Detection From Gaze In Video Mediated Communication," ACM, Mar. 28-30, 2012, 4 Pages, Retrieved from URL: http://medusa.fit.vutbr.cz/TA2/TA2.

Hui J., et al., "An IPV6 Routing Header for Source Routes with the Routing Protocol for Low-Power and Lossy Networks (RPL)," Internet Engineering Task Force Trust, Request for Comments 6554, Mar. 2012, 12 Pages.

International Preliminary Report on Patentability for International Application No. PCT/US2019/035794, mailed Dec. 17, 2020, 8 Pages.

International Search Report and Written Opinion from the International Searching Authority, dated Aug. 13, 2019, 9 pages, for corresponding International Patent Application No. PCT/US2019/035794.

Kuklinski S., et al., "Design Principles of Generalized Network Orchestrators," IEEE International Conference on Communications Workshops (ICC), May 23, 2016, pp. 430-435.

Kulkami R.V., et al., "Computational Intelligence in Wireless Sensor Networks: A Survey," Abstract, IEEE Communications Surveys Tutorials, May 27, 2010, 1 Page.

Liu T., et al., "Data-driven Link Quality Prediction Using Link Features," ACM Transactions on Sensor Networks, Feb. 2014, 35 Pages.

Mckenna S., et al., "Acoustic Event Detection Using Machine Learning: Identifying Train Events," Sep. 2017, pp. 1-5, [Retrieved on Feb. 28, 2018] Retrieved from URL: http/ics229.stanford.edu/proj2012/McKennaMcLaren-AcousticEventDetectionUsingMachineLearningIdentifyingTrainEvents.pdf.

Newman M.E.J., "Analysis Of Weighted Networks," Physical Review Journals, Jul. 20, 2004, 9 Pages, E 70, 056131, Retrieved from URL: http://arxiv.ord/pdf/condmat/0407503.pdf.

Newman M.E.J., "Modularity and Community Structure in Networks," Proceedings of the National Academy of Sciences of the United States of America, PNAS, Washington, DC, Jun. 2006, vol. 103, No. 23, pp. 8577-8582.

Piczak K.J., "Environmental Sound Classification With Convolutional Neutral Networks," IEEE International Workshop on Machine Learning for Signal Processing, Boston, USA, Sep. 17-20, 2015, 6 Pages.

Salamon J., et al., "Deep Convolutional Neutral Networks and Data Augmentation for Environmental Sound Classification," IEEE Signal Processing Letters, Nov. 28, 2016, 5 Pages.

Siddiky F.A., et al., "An Efficient Approach to Rotation Invariant Face Detection Using PCA, Generalized Regression Neural Network and Mahalanobis Distance by Reducing Search Space," Abstract,

(56) References Cited

OTHER PUBLICATIONS

10th International Conference on Computer and Information Technology, Dhaka, Bangladesh, Dec. 2007, 1 Page.
Singh S.K., et al., "Routing Protocols in Wireless Sensor Networks—A Survey," International Journal of Computer Science Engineering Survey (IJCSES), Nov. 2010, vol. 1, No. 2, pp. 63-83.
Tang P., et al., "Efficient Auto-scaling Approach in the Telco Cloud using Self-learning Algorithm," IEEE Global Communications Conference (Globecom), Dec. 6, 2015, pp. 1-6.
Tang Y., et al., "Automatic Belief Network Modeling via Policy Interference for SDN Fault Localization," Journal of Internet Services and Applications, Biomed Central Ltd., London, UK, Jan. 20, 2016, vol. 7, No. 1, pp. 1-13.
Ting J.A., et al., "Variational Bayesian Least Squares: An Application to Brain-Machine Interface Data," Neural Networks, Elsevier Science Publishers, Barking, GB, Oct. 31, 2008, vol. 21, No. 8, pp. 1112-1131, [Jun. 27, 2008], DOI:10.1016/J.NEUNET.2008.06.012, ISSN 0893-6080, XP025507619.
Tsang Y., et al., "Network Radar: Tomography from Round Trip Time Measurements," ICM'04, Sicily, Italy, Oct. 25-27, 2004, 6 Pages.
Vasseur JP., et al., "Routing Metrics Used for Path Calculation in Low-Power and Lossy Networks," Internet Engineering Task Force Trust, Request for Comments 6551, Mar. 2012, 30 Pages.
Winter T, Ed., et al., "RPL :IPV6 Routing Protocol for Low-Power and Lossy Networks," Internet Engineering Task Force (IETF), Request for Comments: 6550, Mar. 2012, [online], 157 pages, [retrieved on Mar. 29, 2018] Retrieved from the internet: URL: https://tools.ietf.org/pdf/rfc6550.pdf.
Zhang X., et al., "Dilated Convolution Neutral Network With Leakyrelu For Environmental Sound Classification," Abstract, 22nd International Conference on Digital Signal Processing (DSP), London, U.K, Aug. 23-25, 2017, 1 Page.
Zinkevich M.A., et al., "Parallelized Stochastic Gradient Descent," Advances in Neural Information Processing Systems 23 (NIPS), 2010, 37 Pages.

* cited by examiner

HYBRID COGNITIVE SYSTEM FOR AI/ML DATA PRIVACY

CROSS-REFERENCE TO RELATED APPLICATION

This application is a continuation of U.S. patent application Ser. No. 18/363,533, filed Aug. 1, 2023, which is in turn a continuation of U.S. patent application Ser. No. 17/104,639, filed Nov. 25, 2020, now U.S. Pat. No. 11,763,024, which is in turn a continuation of, and claims priority to, U.S. Non-Provisional patent application Ser. No. 16/002,934, filed on Jun. 7, 2018, now U.S. Pat. No. 10,867,067, all of which are hereby expressly incorporated by reference in their entirety.

TECHNICAL FIELD

The present disclosure relates generally to protecting private data when training machine learning models, and more specifically pertains to a hybrid system for training and deploying machine learned models wherein private data is maintained in a private cloud.

BACKGROUND

Typically services that can determine the semantic meaning of text or speech consists of a set of cloud services that are accessed through a local client such as a voice, text, or video endpoint. These services can be, for example, live and/or recorded meeting transcriptions, cognitive artificial intelligence (AI) services, virtual assistants, etc. Cloud services are useful for many text or speech services. For example, consumer assistants, such as Siri and Alexa, are backed by a large corpus of data to fulfill user requests, e.g. providing a reply for the user request "What is the weather?". However, for some system environments, such as enterprise, government, or any other type of system environment where data is proprietary and security is a concern, the data required to fulfill many requests is sensitive and may not be available to virtual assistants operating on a public cloud.

Due to the potential sensitive nature of a system's proprietary data, the system can be unwilling or unable to copy large blocks of data to the cloud for the purposes of creating trained models for machine learning services. One possibility is to deploy all cognitive services in the private cloud, however the cognitive services themselves then run the risk of falling behind because these services do not have access to the larger corpus of data available in a public cloud. Services in the private cloud are difficult to maintain and become isolated, causing them to fall behind in accuracy and resulting in poor user experience.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DESCRIPTION OF EXAMPLE EMBODIMENTS

Figure 1:
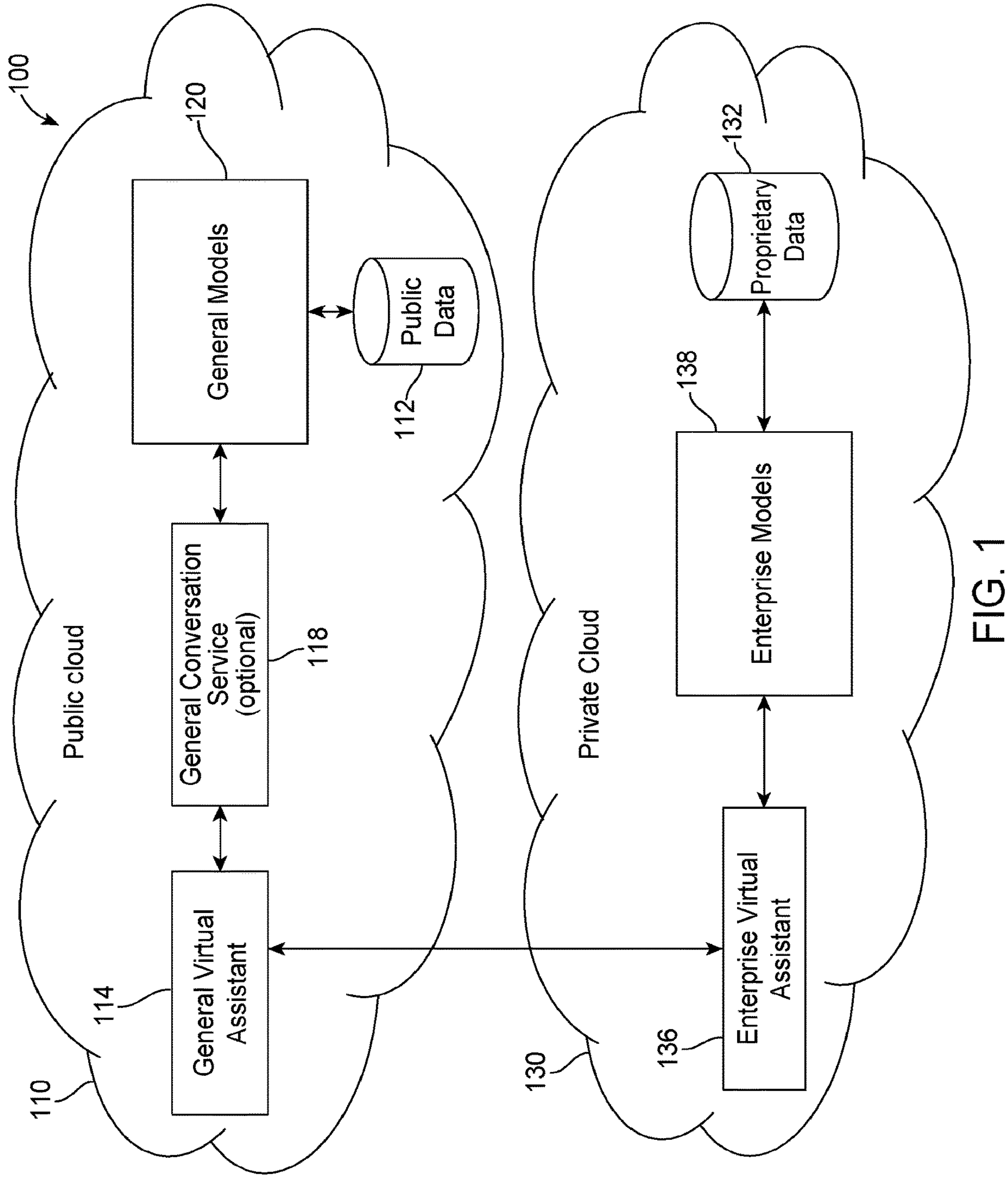
FIG. 1 shows an example hybrid cognitive system in accordance with some aspects of the present technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Overview

Systems, methods, and devices are disclosed for cognitive collaboration systems on a hybrid node—e.g., an endpoint including a first service operating in a first cloud that interoperates with a second service operating in a second cloud. (In some embodiments of the present technology, the first service is a general virtual assistant in a public cloud and the second service is an enterprise virtual assistant in a private cloud). A query is received by a virtual assistant running on the public cloud, and it is determined whether the query pertains to data available on a public cloud resource, or the query pertains to data available on a private cloud resource. When it is determined that the query pertains to the data available on the public cloud resource, the query is interpreted by using a first model that was trained using at least one machine learning technique on data from the public cloud. When it is determined that the query pertains to the data available on the private cloud resource, the query is interpreted by using a second model that was trained using at least one machine learning technique on the data from the private cloud.

Example Embodiments

The disclosed technology addresses the need for a system which maintains core cognitive services in a public cloud while generating trained data in a private cloud using a hybrid node. A user, for example, can access a single access point on the public cloud, but still get the benefit of data on the private cloud as well as the public cloud. This enables systems to deploy machine learning (ML) based services in the private cloud while retaining private cloud security, but without the current difficulties and restrictions of services deployed solely in the private cloud. The present technology accomplishes this by introducing a hybrid system through a hybrid node. The hybrid node provides a general virtual assistant that has access to public data on a public cloud for tasks pertaining to the public data, and that communicates with an enterprise virtual assistant that has access to a private cloud for tasks pertaining to private data only available on the private cloud. This hybrid system provides for a general virtual assistant to be trained on and have access to the large corpus of data in the public cloud, while simultaneously being capable for handling domain specific tasks that require access to sensitive data (either for model training, or for executing tasks), all while avoiding sensitive customer data going to a public cloud. Moreover, this is accomplished without compromising accuracy. For example, the present technology makes use of a hybrid node that can be used for local, private cloud interpretation of queries based on an organization's vocabulary while working in conjunction with a public cloud based service to interpret general purpose queries. A hybrid node serves the purpose of creating trained models on private clouds of one or more enterprises so that the raw customer data and other labelled datasets are not required to go to the public cloud. When the models trained on private data are created, they are used by an enterprise virtual assistant operating in a private cloud in communication with a general virtual assistant operating in a public cloud.

This hybrid system can be expanded beyond just virtual assistants, such as to any task that can be performed based on public and private data. For example, the above hybrid node features could provide the same benefits for any type of structured query.

Moreover, security is preserved. Secure cognitive services can be deployed that have direct access to potentially sensitive customer data on the hybrid node, even if the user seems to be interacting with a single interface (e.g., general virtual assistant). For example, a question-answer service, where a user submits a query and the assistant supplies a response to the query, can be deployed by a service on a public cloud that can determine an intent of a query and can determine that the query pertains to private enterprise data. Based on that determination, the public cloud can pass the query to an assistant with access to the private data in the private cloud separately from the other core cognitive services on the public cloud. This enables queries to be received and interpreted in the public cloud, but communicate with the private cloud as part of the cognitive work flow, while leaving general queries to be handled in the public cloud.

Accordingly, the present technology enables the benefit of data privacy for customers that would be concerned about sensitive data potentially flowing out to the public cloud while still providing the customers with cognitive capabilities of virtual assistants trained on the largest datasets (and therefore better performing).

The present technology also provides the benefit of avoiding a loss of accuracy when abstracting or redacting sensitive data prior to training machine learning models on the data. Additionally, even models trained on the sensitive data that are then exported to a public cloud can result in model details being lost. To optimize accuracy in this type of machine learning system, the hybrid node is actively used for machine learning model generation and at runtime for answering queries, and not as merely a data collector/aggregator.

In this disclosure, the cognitive collaboration system on the hybrid node can achieve all the benefits described above by receiving a query by a virtual assistant running on a public cloud. The system then determines whether the query pertains to data available on a public cloud resource, or the query pertains to data available on a private cloud resource. If it is determined that the query, or a portion of the query, pertains to the data available on the public cloud resource, the query or portion of the query is interpreted by using at least one general model trained on at least one machine learning technique on data from the public cloud. If it determined that the query, or a portion of the query, pertains to the data available on the private cloud resource, the query or portion of the query is interpreted by the using a proprietary/enterprise model trained on at least one machine learning technique on enterprise data from the private cloud. While any programmed set of instructions can be used in place of ML models, the general models and enterprise models will be discussed in the following embodiments as ML models for simplicity.

This enables the introduction of a hybrid node that creates and runs machine learning models trained on local customer data that is kept in the private cloud. As the raw labelled data is used without any aggregation, it results in no loss of accuracy. Moreover, this also enables the question-answer services, for example, to be deployed on the hybrid node in order to keep sensitive data in the private cloud but enable interactions with a public cloud based assistant service. This allows for public cloud based training of general purpose (non-sensitive) queries (e.g. a general assistant that can parse "join my meeting" user requests) and local inferencing for specific enterprise specific queries (e.g. an enterprise specific assistant that can parse a "display Project Triangle content from Company Documents" user request, assuming that "Project Triangle" is an internal acronym or word specific to an enterprise, and not a well known concept to a generic assistant).

FIG. 1 shows an example hybrid cognitive system. A hybrid node can be used to create and run machine learned models on enterprise data, to be used with AI in systems and machines running the machine learned models.

System 100, in some embodiments, can include public cloud 110 that is configured to run a general model trained on at least one machine learning technique on a public cloud resource, such as public data 112 stored on public cloud 110 or software service(s) (not shown) available on the public cloud. Public data 112 can be data from interactions with many users, and is agnostic to a specific enterprise, organization, customer, etc.

Public cloud 110 can include general virtual assistant 114, which receives queries from users and, in response, provides an appropriate response to the queries. General virtual assistant 114, for example, can take in a user query and determine whether the query relates to an enterprise-specific topic or a general topic that can be answered and/or responded to with general services instead. For those queries (or portions of queries) that are appropriately answered by general services, the query can be analyzed (such as through natural language processing (NLP)) to determine how to best handle the query.

General virtual assistant 114, which can be one of many general virtual assistants in system 100 and/or public cloud 110, can analyze the query according to one or more general models 120 that interpret and/or extract features from the text of the query. General conversation service 118 can be an optional service that points general virtual assistant 114 to the appropriate general models 120. General models 120 can assist general virtual assistant 114 in understanding the query so that it can provide an answer or other appropriate response. General models 120 can be trained based on a public cloud resource, such as a store of public data 112 (or a software service available on the public cloud). Training of general models 120 can be continuous or set at predetermined intervals to make sure general models 120 are accurate and up to date.

System 100 can also include private cloud 130 having confidential data stored thereon. System 110 can include enterprise virtual assistant 136, which receives enterprise specific queries from users (through general virtual assistant) and, in response, provides an appropriate response to the enterprise specific queries. Private cloud 130 can train at least one model used by enterprise virtual assistant 136 that is specific and/or customizable to an enterprise, organization, customer, etc. At least one machine learning technique can be used, for example, based on a private cloud resource, such as proprietary data 132 on private cloud 130 or software service(s) (not shown) available on private cloud 130. The private cloud resource is used as the basis to train and/or generate one or more enterprise specific models (e.g., proprietary data 132 can train enterprise models 138).

Proprietary data 132 available on private cloud 130 is confidential data that does not leave the private cloud. None of the proprietary data 132 is shared with non-authorized users.

General virtual assistant 114 can moreover be in communication with enterprise virtual assistant 136. For example, in some embodiments, general virtual assistant 114 on public cloud 110 can handle all the language processing of received queries from the user. The query is processed and determined by general virtual assistant 114 if it partially or wholly includes an enterprise specific topic. This can include the content of the query and/or the context of the query. For example, general virtual assistant 114 can analyze the query and determine its domain (e.g., a broad topic of the query), intents (e.g., a purpose of the query), and/or entities in the query (e.g., items and/or properties that belong to the query). If the domain, an intent, or entity in the query requires enterprise specific processing or interpretation, general virtual assistant 114 can communicate with enterprise virtual assistant 136.

Enterprise virtual assistant 114 can provide an appropriate response to the query while keeping confidential data within private cloud 130 or limited to authorized entities. For example, in some embodiments, a query may need an answer provided by enterprise models 138 trained on proprietary data 132 on the private cloud. Enterprise models 138 can interpret and/or extract features from the query (such as through any natural language processing technique). Enterprise models 138 can be trained based on a store of proprietary data 132 in the private cloud, and based on the training, generate enterprise specific models, thereby keeping proprietary data 132 on private cloud 130. General virtual assistant 136 running on public cloud 110 can receive a response to the query from enterprise virtual assistant 136 running on private cloud 130.

Limited portions of enterprise models 130 may be reproduced and added to general virtual assistant 114 so that general virtual assistant 114 can understand that certain vocabulary or queries are intended for private cloud 130. Determining a response to actual query, however, is carried out by enterprise models 130 on private cloud 130.

For example, enterprise models 138 can be duplicated at least partially on general models 120 or general virtual assistant 114, such that general virtual assistant 114 knows what a user is talking about when the user uses enterprise specific terminology. For example, enterprise models 138 can be exported to public cloud 110, which enables general virtual assistant 114 to respond to enterprise specific queries quickly.

Moreover, both general and enterprise assistants can be fully updatable. For example, the enterprise or company can decide that they want to enhance the enterprise models 138. New enterprise specific language, for example, might come into common usage, such as the new use of some project code name like "Project Triangle". The current trained enterprise models 138 or enterprise virtual assistant 136 will not recognize the new terminology of "Project Triangle". When enterprise virtual assistant 136 can't recognize and/or match the terminology with any known terminology, enterprise virtual assistant 136 can flag the terminology as unsupported. In order to update enterprise virtual assistant 136, enterprise models 138 can expand the recovery of the unsupported terminology and/or expand the domain of knowledge, such as by defining new domains, intents, or entities from extracted topics. This expansion can lead to an update in real time, near real time, and/or based on a manual request from the enterprise to update the enterprise models 138. The update can be, for example, a partial or full application expansion or change.

For example, in some embodiments, the general models 120 are always going to be as up to date as possible, since the general models 120 are in public cloud 110 and have access to a greater volume of training data. Updates to the general models 120 can be related to wide, systematic updates that apply across the entire virtual assistant service and applies to everyone who uses the service. However, at the customizable enterprise domain level, the update to enterprise specific models and/or features can be as often as the enterprise wants to push an updated model. The updates can be to the enterprise models 138 itself and custom integrations that come through the hybrid nodes that can happen independently of proprietary data 132. Updates can be managed through a declarative interface where extensions to the custom model from the hybrid node can be defined, either manually or automatically. The extensions can be automatically recognized by the virtual assistants (e.g., such as through extracting a new enterprise specific topic), for example, which could maintain the new extensions by training and generating enterprise models based on proprietary data 132, as disclosed above.

Figure 2:
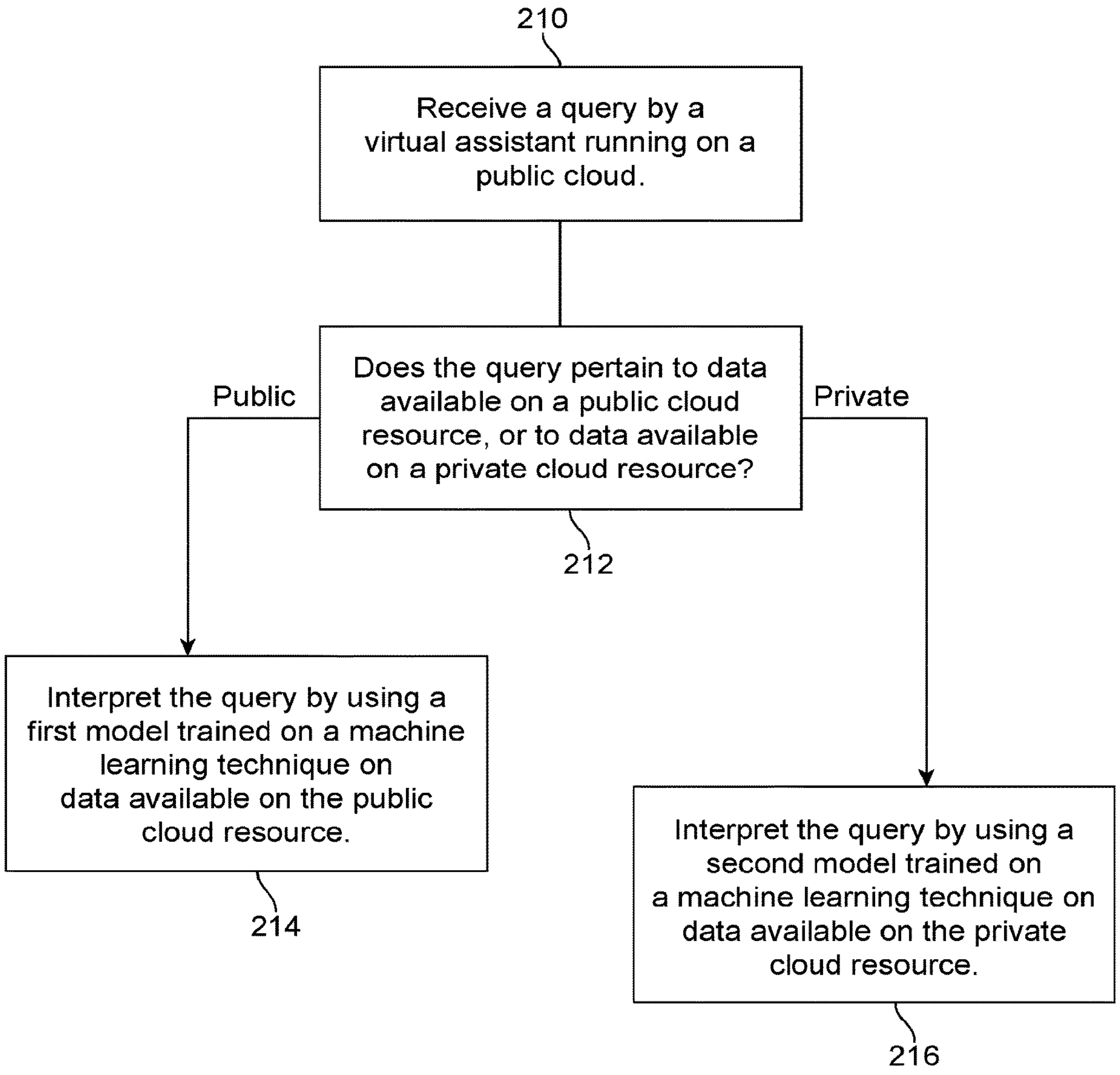
FIG. 2 is a flow chart illustrating an example embodiment of a hybrid cognitive service in accordance with some aspects of the present technology.

FIG. 2 is a flow chart illustrating an example embodiment of a hybrid cognitive service. The method begins by receiving a query by a virtual assistant running on a public cloud (such as by general virtual assistant 114) (step 210). It is then determined whether the query pertains to data available on a public cloud resource, or the query pertains to data available on a private cloud resource (step 212). In order to determine whether the query pertains to the data available on the public cloud resource, or to the data available on the private cloud resource, the general virtual assistant and/or a general conversation service module can recognize an intent included in the query, and identify that the intent is best handled by the general model or the enterprise model.

If it is determined that the query pertains to data available on a public cloud resource, the query is interpreted by using a general model trained on at least one machine learning technique on data from the public cloud (step 214). However, if it is determined that the query pertains to the data available on the private cloud resource, the query is interpreted by the using an enterprise specific model trained on at least one machine learning technique on data from the private cloud (step 216).

In some embodiments the general virtual assistant can utilize both the public cloud resource and the private cloud resource to interpret and answer the query. For example, an initial query in a dialog between general virtual assistant 114 and a user can be interpreted using one or more general models, and a subsequent query, even if it is part of the same conversation, can be interpreted by one or more enterprise models.

Figure 3:
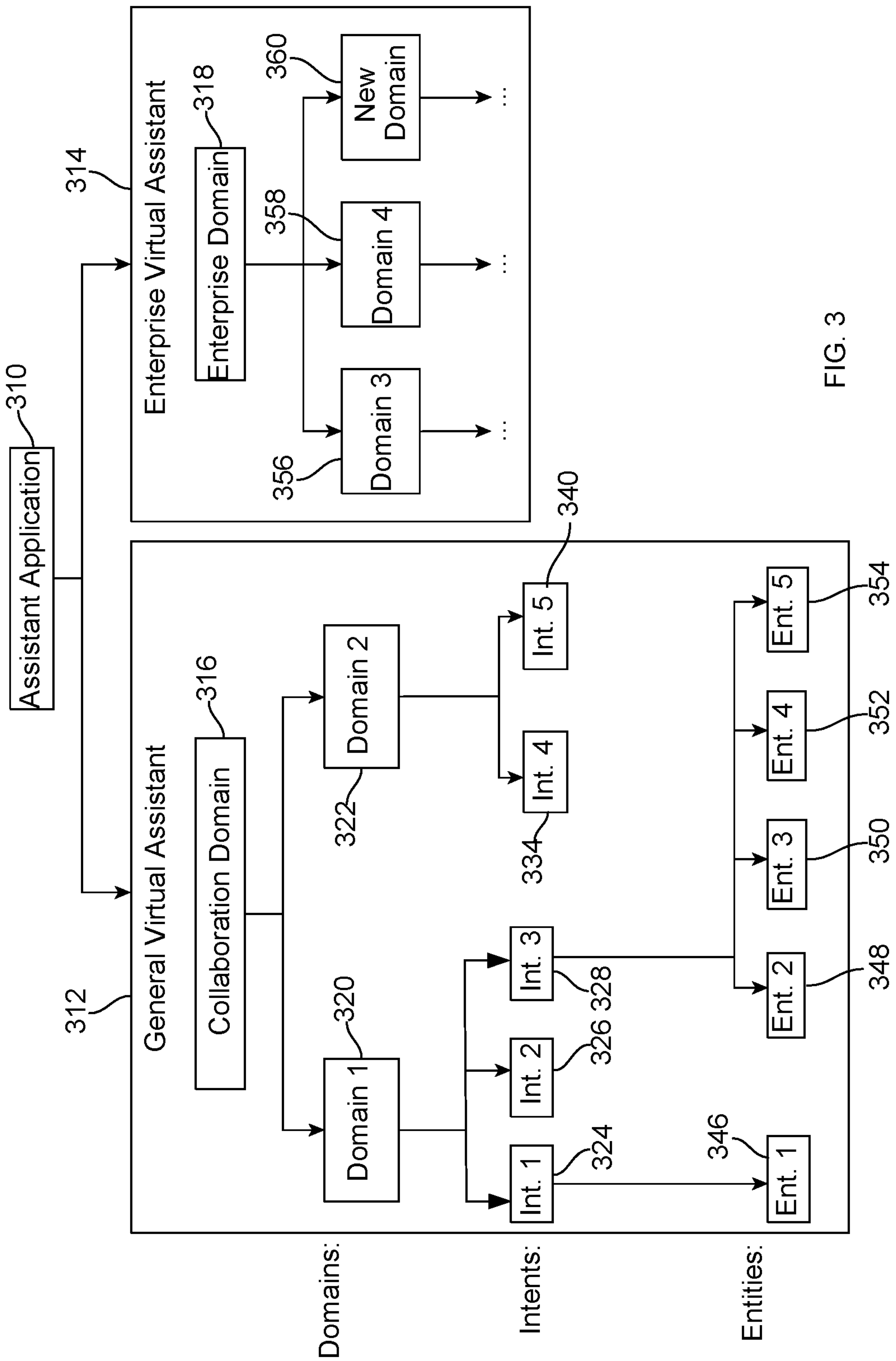
FIG. 3 illustrates an example architecture of a virtual assistant in accordance with some aspects of the present technology.

FIG. 3 illustrates an example architecture of a virtual assistant according to some embodiments. Assistant application 310 can include general virtual assistant 312 and enterprise virtual assistant 314. Assistant application 310 can receive a query, and parse the query to identify whether the query falls under certain domains (e.g., a broad topic of the query), has certain intents (e.g., a purpose of the query), and/or has certain entities (e.g., items and/or properties that belong to the query). For example, assistant application 310 can determine whether the query belongs under a collaboration domain 316 that includes general conversation services and general virtual assistants, or under an enterprise domain 318 that includes enterprise conversation services and enterprise virtual assistants.

The virtual assistants can include any number of sub domains that can apply to queries. For example, general virtual assistant 312 can parse a query into a domain 1 320 (e.g., a meetings domain) or domain 2 322 (e.g., a calling domain) under collaboration domain 316. For example, a user can ask the assistant about things like meetings and calling functionality, which applies to all users of the system. For example, a user can generate a query by asking about joining a meeting, which could be parsed as a query with an intent that falls under a meetings domain (e.g., domain 1 320).

Each domain can further be subdivided into related intents that subdivide the domain into main topics or purposes defined as intents. So, for example, if domain 1 320 is a meeting domain, then it can include intent 1 324, intent 2 326, and/or intent 3 328, which can be, but is not limited to, intents like greet, schedule, join, get meeting information, and navigate. Similarly, if domain 322 is a calling domain, it can include intent 4 334 and/or intent 5 340, such as intents like call, get contact, mute, volume, add callers, and end call. Each intent can also include an entity 346, 348, 350, 352, 354 (e.g., the a greet intent can include a username entity), or multiple entities (e.g., a get meeting information intent can include meeting ID, meeting URL, meeting title, and meeting host entities). Entities can be items and/or properties that belong to the query.

Similarly, the customized enterprise virtual assistant 314 can parse a query into multiple domains, sub domains, intents, entities, etc. For example, enterprise domain 318 can encompass enterprise specific sub domains, such as domain 3 356 (e.g., a meetings domain) and domain 4 358 (e.g., a calling domain). Each domain can also be subdivided into related intents that subdivide the domain into main topics, and each intent can also include one or more entities.

In some embodiments, the enterprise domain, intents, and entities can be exported to the public cloud nodes, which enables assistant application 310 to respond to queries quickly. A user, for example, can work initially with the general purpose assistant (e.g., general virtual assistant 312). The user can ask general virtual assistant 312 something, and general virtual assistant 312 can recognize the appropriate domain (e.g., collaboration domain 316 or enterprise domain 318) based on whether the query pertains to general models or enterprise specific data. General virtual assistant 312 can send the query to the appropriate ML models, by forwarding the query to enterprise domain 318 if the query, for example, pertains to enterprise specific data. General virtual assistant 312 can also pass any associated data along with the query, such that it's as if the query initially entered enterprise virtual assistant 314.

Assistant application 310 can also include customizable content. In some embodiments, new domains 360 can be added to enterprise domain 318. For example, domains can be added in a declarative way, such as declaratives that include extracted or newly defined topics within the enterprise. While domains in this embodiment are related to topics within the organization, new domains can be added for topics across different organizations. For example, topics shared across multiple organizations can be added to different customized virtual assistants (e.g., "HR"), although the words that trigger each customized virtual assistant can be specific to each organization.

An example of customizable content can be related to confidential data that trains enterprise models in the private cloud. For example, the word "Project Triangle" can be very company specific (e.g., an internal word not well known to a generic assistant), and can be associated with a sensitive data source. A general customer would not know what "Project Triangle" refers to, even if the customer works in a related field, because it's an internal service (e.g., an internal management system, for example). Assistant application 310, like SPARK, SIRI, or ALEXA systems, would also not recognize the word "Project Triangle" without some form of integration into enterprise virtual assistant 314. New pieces of vocabulary can create unknown noun problems. For example, if a user says "fetch document 3 from Project Triangle", assistant application 310 has to know there's a system called Project Triangle, and it has to know it can do some sort of retrieval based on that. In order to integrate customizable content into assistant application 310, assistant application 310 needs a form of extensibility. The customized content can be extended through identifying and creating a number of trained enterprise models that were introduced from the premise or from the hybrid node to the public cloud.

For example, a user may query about finding a company expert in a certain field. Assistant application 310 can look through the domains, intents, and/or queries and determine that expert finding is not there. But content can be customized to the enterprise by extending the system with an expert finding domain. Since a new expert finding domain needs access to a corporate directory and the skills of people who may be internal to the business, assistant application 310 can create a trained model for expert finding. Expert models can be trained on data in the private cloud, such as proprietary data 132.

Assistant application 310 can additionally include extra security features, such as determining access rights to the enterprise models based on the domain, intent, and/or entity the query falls into. Additionally and/or alternatively, assistant application can determine access rights with credentials as well, such as through an ID that represents the individual and/or individual customer organization/enterprise. Once access rights are determined, the appropriate enterprise model with the appropriate access rights can be selected. The query can then be interpreted from the selected enterprise model to which access rights are permitted for the user.

Figure 4:
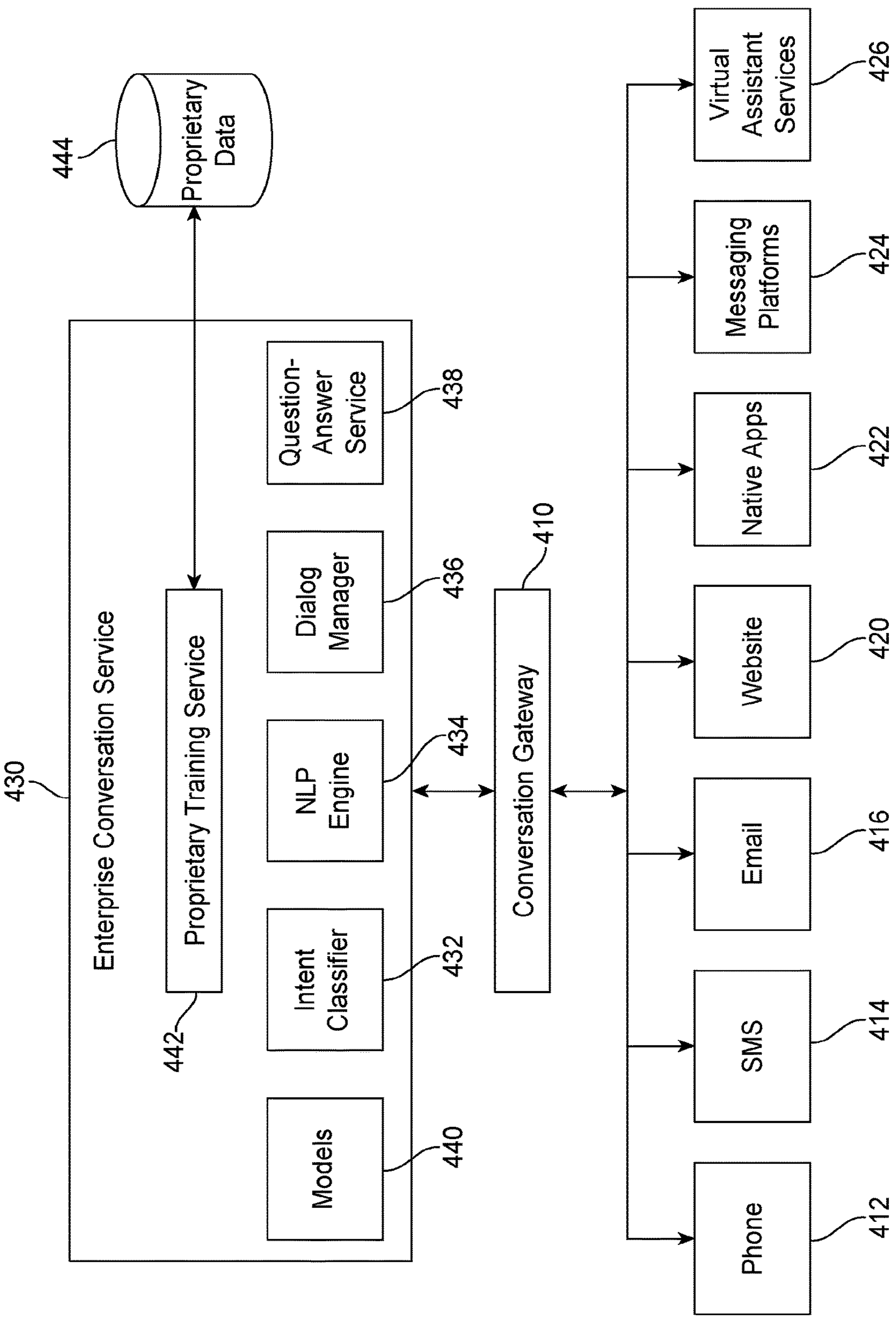
FIG. 4 illustrates an example architecture of an enterprise conversation service in accordance with some aspects of the present technology.

FIG. 4 illustrates an example architecture of an enterprise conversation service according to some embodiments. A user can interact in many ways with the system, such as through a web app or a native app on a computational device, such as a mobile device, laptop, desktop, etc. An application gateway, such as conversation gateway 410, can connect enterprise conversation service 430 to any number of client devices, such as phone 412, SMS 414, email 416, website 420, messaging platforms 424, virtual assistant services 426, etc. Conversation gateway 410 can receive the user query from a client device, for example, and submit the query to enterprise conversation service 430, which can include intent and entity classifier 432, NLP engine 434, dialog manager 436, and question-answerer service 438.

NLP engine 434 uses natural language processing to analyze the query. A query of "What's the status of Project Triangle in Galway today?" can be broken down by intent classifier 432 by breaking the sentence out into a topic about project status. The sentence can be broken up by enterprise models 440 trained in the private cloud by proprietary training service 442 using proprietary data 444. Intent classifier 432 can also assign a score, such that a high topic score like 90% for "status", and identifying "Galway" as a location with a certainty of about 90%, causes dialog manager 436 to use an internal enterprise service to look up the status of Project Triangle for the location. The question-answer service 438 can then provide the looked up status result to the user.

In some embodiments, dialog manager 436 can also manage conversational context. So if, for example, a user submits a query of "So how is it today?", current conversational assistants would have no clue what the user is talking about. With context, the query could be determined to be about the status of Project Triangle because that's the last thing that the user previously asked about. Dialog manager 436, accordingly, can determine conversational context by maintaining a record of previous queries or conversations that relate to the same thing, whether its asked the same way or in different ways between dialog manager 436 and the question-answer service 438.

In some embodiments, enterprise models 440 are duplicated on general models or general virtual assistants, such that a general virtual assistant would know what a user is talking about when the user uses enterprise specific terminology. In that way, the general virtual assistant can forward the query to the correct enterprise virtual assistant to fulfill the query. For example, services like intent classifier 432 and dialog manager 436 and question-answer service 438 on the private cloud can be duplicated on the public cloud. Thus, the general model and the enterprise models can share at least one common functionality, such that the general model can determine, based on the at least one common functionality, that the query pertains to the enterprise model.

Figure 5:
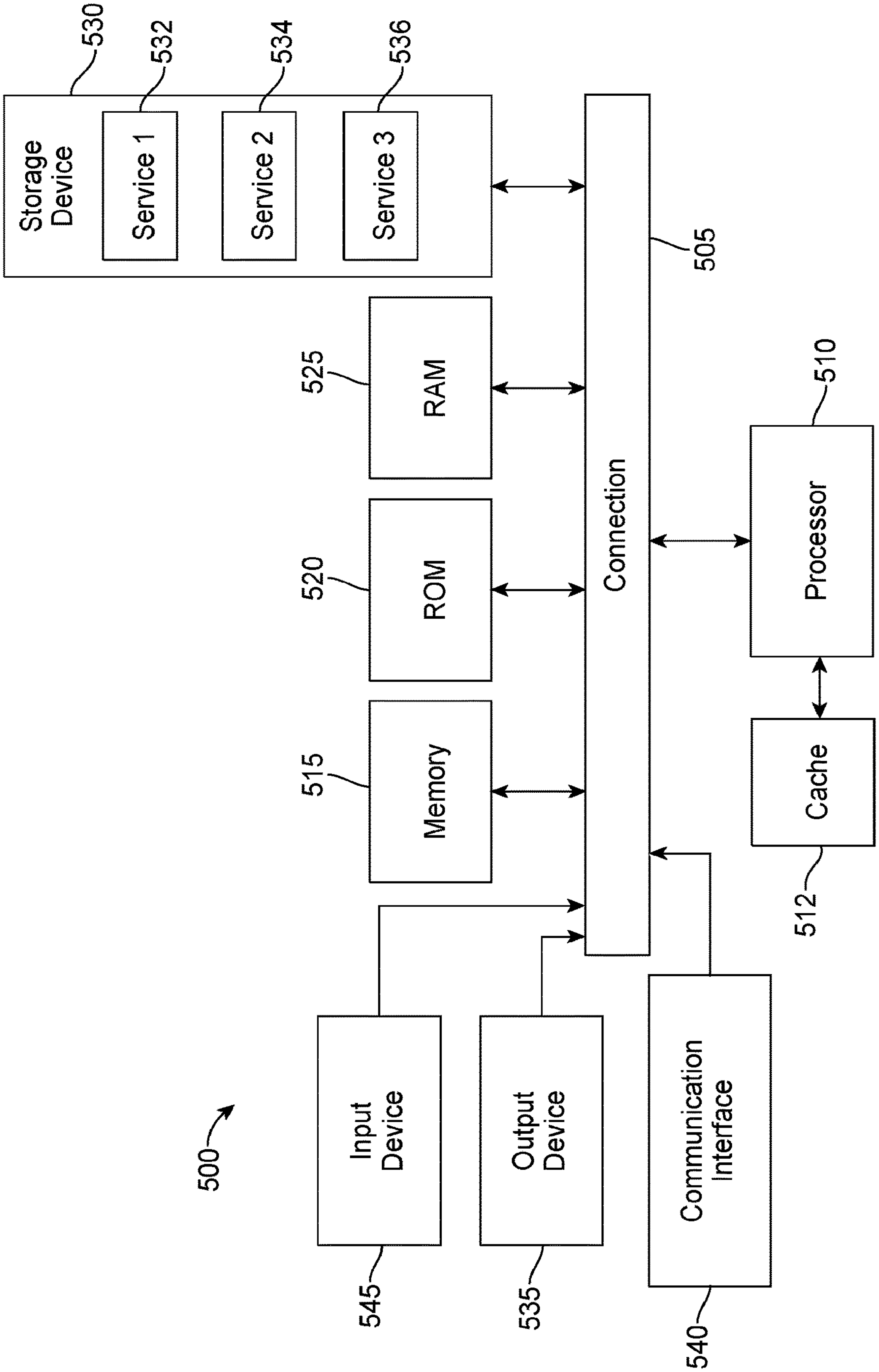
FIG. 5 shows an example of a system for implementing some aspects of the present technology.

FIG. 5 shows an example of computing system 500 for use in components illustrated in FIGS. 1, 2, 3, and 4, in which the components of the system are in communication with each other with each other using connection 505. Connection 505 can be a physical connection via a bus, or a direct connection into processor 510, such as in a chipset architecture. Connection 505 can also be a virtual connection, networked connection, or logical connection.

In some embodiments computing system 500 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read only memory (ROM) and random access memory (RAM) to processor 510. Computing system 500 can include a cache of high-speed memory connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:

receiving, at a virtual assistant, a query;

determining, using natural language processing, whether the query is requesting to access public data of a public cloud or requesting to access private data of a private cloud and whether a user associated with the query has access rights to the private cloud;

in response to the determination, interpreting the query by using a first machine learning model trained on at least one machine learning technique on the public data of the public cloud or interpreting the query by using a second machine learning model trained on at least one machine learning technique on the private data of the private cloud when the user has access rights to the private cloud; and transmitting a response to the query.

2. The method of claim 1, wherein the determining whether the query is requesting to access the public data of the public cloud or the private data of the private cloud further comprising:

parsing the query to determine one or more domains; and determining whether the one or more domains are in the public cloud or in the private cloud.

3. The method of claim 2, further comprising:

determining whether the one or more domains has one or more intents; and determining whether the one or more intents are in the public cloud or in the private cloud.

4. The method of claim 3, further comprising:

determining whether the one or more intents has one or more entities; and determining whether the one or more entities is in the public cloud or in the private cloud.

5. The method of claim 1, wherein determining whether the query is requesting to access the private data of the private cloud further comprising:

receiving, at the virtual assistant, one or more domains, one or more intents, or one or more entities of the private cloud; and determining whether the one or more domains, the one or more intents, or the one or more entities are related to the query.

6. The method of claim 1, wherein the private data available on the private cloud is confidential data, and wherein the second machine learning model is trained on the confidential data.

7. The method of claim 1, wherein the virtual assistant includes customizable content based on domains of the public cloud or the private cloud.

8. A virtual assistant comprising:

at least one processor; and at least one memory storing instructions, which when executed by the at least one processor, causes the at least one processor to:

receive a query;

determine, using natural language processing, whether the query is requesting to access public data of a public cloud or requesting to access private data of a private cloud and whether a user associated with the query has access rights to the private cloud;

in response to the determination, interpret the query by using a first machine learning model trained on at least one machine learning technique on the public data of the public cloud or interpreting the query by using a second machine learning model trained on at least one machine learning technique on the private data of the private cloud when the user has access rights to the private cloud; and transmit a response to the query.

9. The virtual assistant of claim 8, wherein the determining whether the query is requesting to access the public data of the public cloud or the private data of the private cloud further comprising instructions which when executed by the at least one processor, causes the at least one processor to:

parse the query to determine one or more domains; and determine whether the one or more domains are in the public cloud or in the private cloud.

10. The virtual assistant of claim 9, further comprising instructions which when executed by the at least one processor, causes the at least one processor to:

determine whether the one or more domains has one or more intents; and determine whether the one or more intents are in the public cloud or in the private cloud.

11. The virtual assistant of claim 10, further comprising instructions which when executed by the at least one processor, causes the at least one processor to:

determine whether the one or more intents has one or more entities; and determine whether the one or more entities is in the public cloud or in the private cloud.

12. The virtual assistant of claim 9, wherein determining whether the query is requesting to access the private data of the private cloud further comprising instructions which when executed by the at least one processor, causes the at least one processor to:

receive one or more domains, one or more intents, or one or more entities of the private cloud; and determine whether the one or more domains, the one or more intents, or the one or more entities are related to the query.

13. The virtual assistant of claim 8, wherein the private data available on the private cloud is confidential data, and wherein the second machine learning model is trained on the confidential data.

14. The virtual assistant of claim 9, wherein the virtual assistant includes customizable content based on domains of the public cloud or the private cloud.

15. At least one non-transitory computer readable medium storing instructions, which when executed by at least one processor of a virtual assistant, causes the virtual assistant to:

receive a query;

determine, using natural language processing, whether the query is requesting to access public data of a public cloud or requesting to access private data of a private cloud and whether a user associated with the query has access rights to the private cloud, wherein the determining includes processing the query through a first machine learning model;

in response to determining that the query is requesting to access the public data of the public cloud, respond to the query with the public data of the public cloud;

in response to determining that the query is requesting to access the private data of the private cloud, interpret the query by using a second machine learning model trained on at least one machine learning technique on the private data of the private cloud when the user has access rights to the private cloud; and transmit a response to the query.

16. The at least one non-transitory computer readable medium of claim 15, wherein the determining whether the query is requesting to access the public data of the public cloud or the private data of the private cloud further comprising instructions which when executed by the at least one processor, causes the virtual assistant to:

parse the query to determine one or more domains; and determine whether the one or more domains are in the public cloud or in the private cloud.

17. The at least one non-transitory computer readable medium of claim 16, further comprising instructions which when executed by the at least one processor, causes the virtual assistant to:

determine whether the one or more domains has one or more intents; and determine whether the one or more intents are in the public cloud or in the private cloud.

18. The at least one non-transitory computer readable medium of claim 17, further comprising instructions which when executed by the at least one processor, causes the virtual assistant processor to:

determine whether the one or more intents has one or more entities; and determine whether the one or more entities is in the public cloud or in the private cloud.

19. The at least one non-transitory computer readable medium of claim 15, wherein determining whether the query is requesting to access the private data of the private cloud further comprising instructions which when executed by the at least one processor, causes the virtual assistant to:

receive one or more domains, one or more intents, or one or more entities of the private cloud; and determine whether the one or more domains, the one or more intents, or the one or more entities are related to the query.

20. The at least one non-transitory computer readable medium of claim 15, wherein the private data available on the private cloud is confidential data, and wherein the second machine learning model is trained on the confidential data.

* * * * *